US012568021B2

(12) United States Patent
Bush

(10) Patent No.: US 12,568,021 B2
(45) Date of Patent: Mar. 3, 2026

(54) SYSTEM AND METHOD FOR TIME-SENSITIVE NETWORK (TSN) IMPLEMENTATION OF NETWORK SLICING

(71) Applicant: Dolby Intellectual Property Licensing, LLC, Wilmington, DE (US)

(72) Inventor: Stephen Francis Bush, Latham, NY (US)

(73) Assignee: Dolby Intellectual Property Licensing, LLC, San Francisco, CA (US)

( * ) Notice: Subject to any disclaimer, the term of this patent is extended or adjusted under 35 U.S.C. 154(b) by 85 days.

(21) Appl. No.: 18/579,253

(22) PCT Filed: Jul. 15, 2022

(86) PCT No.: PCT/US2022/037278
§ 371 (c)(1),
(2) Date: Jan. 12, 2024

(87) PCT Pub. No.: WO2023/288055
PCT Pub. Date: Jan. 19, 2023

(65) Prior Publication Data
US 2024/0323088 A1     Sep. 26, 2024

Related U.S. Application Data

(60) Provisional application No. 63/222,316, filed on Jul. 15, 2021.

(51) Int. Cl.
*G06F 15/173*     (2006.01)
*H04L 41/0894*     (2022.01)
*H04L 41/0895*     (2022.01)

(52) U.S. Cl.
CPC ...... *H04L 41/0894* (2022.05); *H04L 41/0895* (2022.05)

(58) Field of Classification Search
CPC ........................ H04L 41/0894; H04L 41/0895
See application file for complete search history.

(56) References Cited

U.S. PATENT DOCUMENTS

| 2015/0363355 | A1 | 12/2015 | Concer et al. |
| 2020/0259896 | A1 | 8/2020 | Sachs et al. |

(Continued)

FOREIGN PATENT DOCUMENTS

| WO | 2023288055 A1 | 1/2023 |

OTHER PUBLICATIONS

Extended European Search Report for related European Patent Application No. 22842924.7, dated Apr. 1, 2025, 11 pages.

(Continued)

*Primary Examiner* — Joseph R Maniwang
(74) *Attorney, Agent, or Firm* — Morgan, Lewis & Bockius LLP

(57) ABSTRACT

Techniques for communication over a communication network may include determining a plurality of network slices based on a plurality of services supported by the communication network, wherein each of the plurality of network slices supports communication of data associated with at least one service. A plurality of data streams may be configured within the communication network. Each data stream being configured in accordance with at least one of a plurality of time-sensitive network policies. A first data stream of the plurality of data streams corresponding to a first network slice of the plurality of network slices may be determined.

16 Claims, 8 Drawing Sheets

(56) References Cited

U.S. PATENT DOCUMENTS

2021/0028988 A1     1/2021   Jana et al.
2024/0305533 A1*    9/2024   Bai ....................... H04W 24/02

OTHER PUBLICATIONS

Bhattacharjee Sushmit et al., "Network Slicing for TSN-Based Transport Networks", IEEE Access, IEEE, USA, vol. 9, Apr. 21, 2021, pp. 62788-62809, XP011851891.
Nokia et al., "Vertical_LAN TSN related CR for non-FASMO corrections", 3GPP Draft, s2-2002570, 3rd Generation Partnership Project (3GPP), Mobile Competence Centre.
Search Report and Written Opinion issued in corresponding International Patent Application No. PCT/US2022/037278, dated Oct. 5, 2022, 8 pages.
International Search Report and Written Opinion for International Patent Application No. PCT/US2022/037278, dated Oct. 5, 2022, 7 pages.

* cited by examiner

600

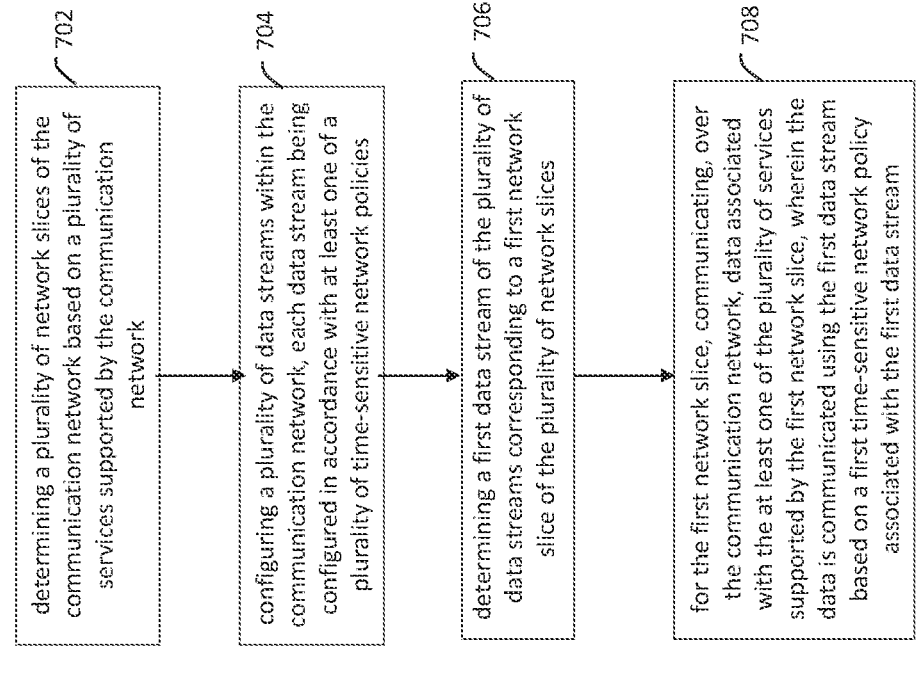

700 determining a plurality of network slices of the communication network based on a plurality of services supported by the communication network

702 configuring a plurality of data streams within the communication network, each data stream being configured in accordance with at least one of a plurality of time-sensitive network policies

704 determining a first data stream of the plurality of data streams corresponding to a first network slice of the plurality of network slices

706 for the first network slice, communicating, over the communication network, data associated with the at least one of the plurality of services supported by the first network slice, wherein the data is communicated using the first data stream based on a first time-sensitive network policy associated with the first data stream

Slice 1 (KSM flow1)

Slice 2 (KSM flow2)

SYSTEM AND METHOD FOR TIME-SENSITIVE NETWORK (TSN) IMPLEMENTATION OF NETWORK SLICING

CROSS-REFERENCE TO RELATED APPLICATIONS

This application claims priority to and is a 371 National Stage entry of International Patent Application No. PCT/US2022/037278 filed Jul. 15, 2022, which claims benefit to U.S. Provisional Patent Application No. 63/222,316, filed Jul. 15, 2021, which are incorporated herein by reference in their entirety.

TECHNICAL FIELD

The subject matter described herein relates to communication networks, and, more particularly, to time-sensitive networking and network slicing techniques implemented in wireless communication networks.

BACKGROUND 5G network slicing enables virtualized and independent logical networks on the same physical network infrastructure. Each network slice is an isolated, end-to-end network tailored to fulfil requirements requested by a particular application or service. However, network slices may not meet certain restriction related to timing, e.g., scheduling, latency, priority, synchronization, etc., as required by various services supported by the 5G network. There is, therefore, a need for a time-based or time-sensitive solution for 5G networks with network slicing to meet the (timing) requirements for different services using customized, isolated, end-to-end logical networks over a common infrastructure.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of communication over a communication network. The method may include determining a plurality of network slices of the communication network based on a plurality of services supported by the communication network, wherein each of the plurality of network slices is configured to support communication of data associated with at least one of the plurality of services; configuring a plurality of data streams within the communication network, each data stream being configured in accordance with at least one of a plurality of time-sensitive network policies; determining a first data stream of the plurality of data streams corresponding to a first network slice of the plurality of network slices; and for the first network slice, communicating, over the communication network, data associated with the at least one of the plurality of services supported by the first network slice, wherein the data is communicated using the first data stream based on a first time-sensitive network policy associated with the first data stream.

Another general aspect includes a system for communication over a communication network. The system may include one or more processors configured to: determine a plurality of network slices of the communication network based on a plurality of services supported by the communication network, wherein each of the plurality of network slices is configured to support communication of data associated with at least one of the plurality of services; configure a plurality of data streams within the communication network, each data stream being configured in accordance with at least one of a plurality of time-sensitive network policies; determine a first data stream of the plurality of data streams corresponding to a first network slice of the plurality of network slices; and for the first network slice, communicate, over the communication network, data associated with the at least one of the plurality of services supported by the first network slice, wherein the data is communicated using the first data stream based on a first time-sensitive network policy associated with the first data stream.

BRIEF DESCRIPTION OF THE DRAWINGS

The present subject matter will be better understood from reading the following description of non-limiting implementations, with reference to the attached drawings, wherein below:

FIG. 7 is flowchart illustrating a method in accordance with some implementations of this disclosure; and FIG. 8 illustrates example TSN data streams corresponding to different network slices in accordance with some implementations of this disclosure.

DETAILED DESCRIPTION

Figure 1:
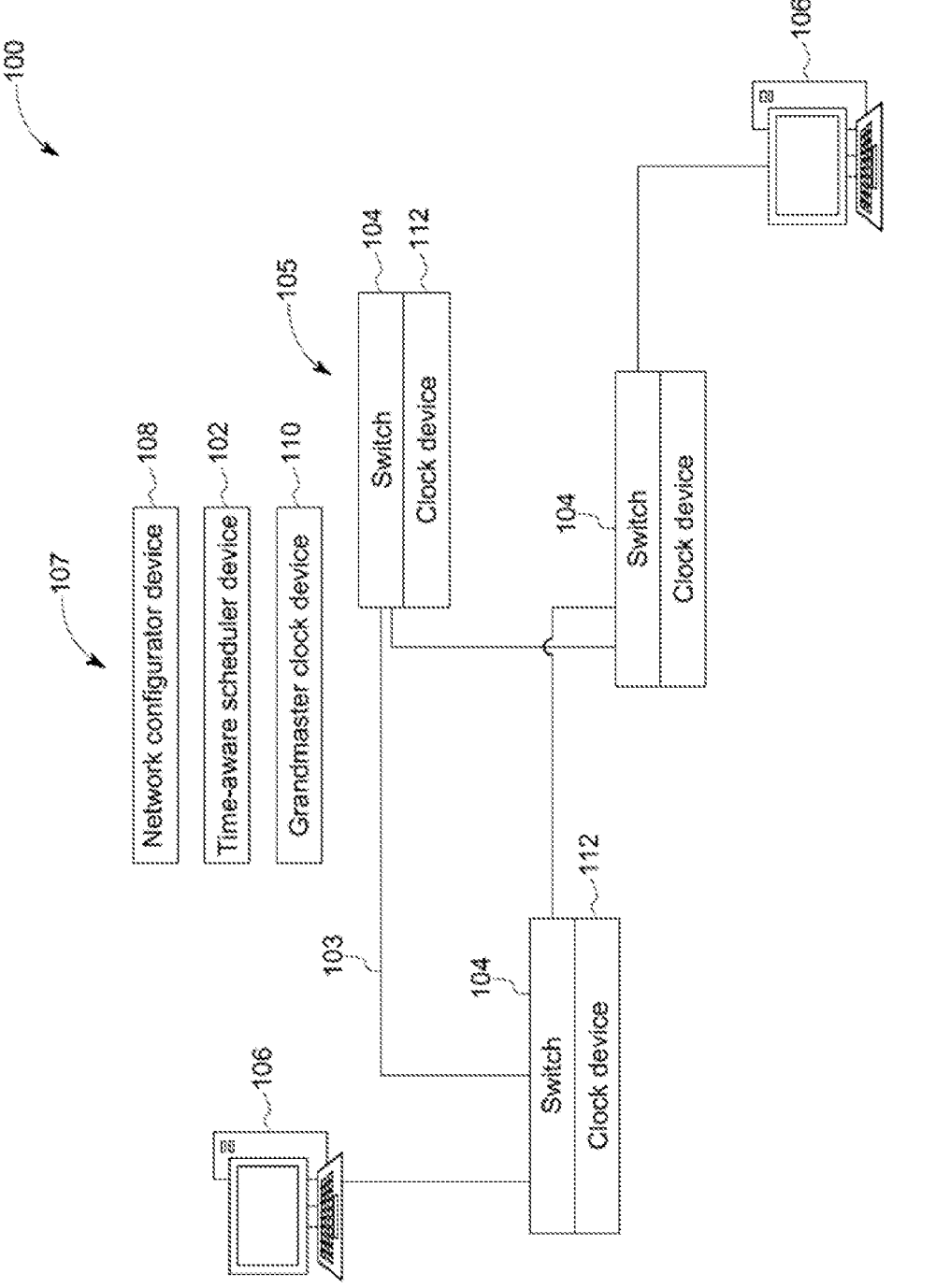
FIG. 1 schematically illustrates one implementation of a time-sensitive network (TSN) system.

In several implementations of the present disclosure, 5G network slicing is implemented by transporting data for individual network slices over separate and distinct time-sensitive network (TSN) streams or flows within the 5G System (5GS). This provides a benefit of enabling custom priority to individual slices by controlling the TSN scheduling of those slices within the 5GS. Network slicing may also require logical abstractions of network resources and their configuration, management, and control using software-defined networking (SDN) and network function virtualization (NFV). Management and control of 5G network slices is a time-sensitive operation that may also benefit from the TSN implementation within the 5G system. Thus, this disclosure integrates TSN into management and control of 5G network slices as well as a transport method for data flowing through network slices.

The following description with reference to the accompanying drawings is provided to assist in a comprehensive understanding of various implementations of the disclosure as defined by the claims and their equivalents. It includes various specific details to assist in that understanding but these are to be regarded as merely exemplary. Accordingly, those of ordinary skill in the art will recognize that various changes and modifications of the various implementations described herein can be made without departing from the scope and spirit of the disclosure. In addition, descriptions of well-known functions and constructions may be omitted for clarity and conciseness.

Deterministic communication techniques in accordance with time-sensitive networking (TSN) are defined in a set of IEEE 802.1 amendments that enable deterministic QoS guarantees for delay and jitter of time-critical traffic flows even in cases where different traffic flows with different statistical characteristics are multiplexed. A categorization of relevant IEEE TSN standards is provided in Table 1. TSN synchronization is covered by IEEE 802.1AS and 802.1AS-Rev.

TABLE 1

| Category | Standards |
|---|---|
| Time Synchronization Providing network wide precise synchronization of the clocks of all entities at Layer 2. | IEEE 802.1AS & IEEE 802.1AS-Rev (Network Timing & Synchronization) |
| Latency & Jitter Separating traffic into traffic classes and differentiated forwarding & queuing of the frames according to these traffic classes. | IEEE 802.1Qav (Credit Based Shaping) IEEE 802.1Qbv (Scheduled Traffic) IEEE 802.3br & IEEE 802.1Qbu (Frame Preemption) IEEE 802.1Qch (Cyclic Queuing) IEEE 802.1Qcr (Asynchronous Traffic Shaping) |
| Reliability & Redundancy Maintaining network wide traffic integrity by providing redundant paths and policing at the ingress queues. | IEEE 802.1CB (Frame Replication & Elimination) IEEE 802.1Qca (Path Control & Reservation) IEEE 802.1Qci (Per-Stream Filtering) |
| Resource Management Providing dynamic discovery, configuration and monitoring of the network as well as resource allocation & registration. | IEEE 802.1Qat & IEEE 802.1Qcc (Stream Reservation) IEEE 802.1Qcp (YANG Models) IEEE 802.1CS (Link-Local Reservation) |

In accordance with the TSN standard, in a TSN Data Plane, the data plane delay guarantees can be provided through techniques like Scheduled Traffic (IEEE 802.1Qbv), Frame Preemption (IEEE 802.3br, IEEE 802.1Qbu), Asynchronous Traffic Shaping (ATS) (802.1Qcr), and Cyclic Queueing and forwarding (802.1Qch). These standards define how frames belonging to a particular traffic class and having a particular priority are handled by TSN-enabled bridges. Further, in regard to the TSN control plane, resource management, configuration, resource allocation, and registration aspects are covered by a) 802.1Qcc, describing the different configuration models and focusing on the centralized case, b) 802.1Qdd, covering the fully distributed case and c) 802.1Qca, which enables explicit path selection and bandwidth reservation.

The key elements in a TSN network in the context of configuration and management are talkers, listeners, Bridge, and the User-Network Interface (UNI). Talkers and listeners are the end-stations that produce and consume data-streams respectively. The user side of the UNI comprises the talkers and listeners, while the network side comprises the Bridge that transfers the data frames from talkers to one or more listeners. A stream in this context is a unidirectional flow of data. The main idea is that the users specify the requirements for the streams without any detailed knowledge of the network. The network obtains these requirements, analyzes the topology and capabilities of the Bridge, and then configures the Bridge accordingly. For this purpose, IEEE 802.1Qcc proposed three configuration models.

Fully Distributed Model: In this model, the user requirements from the end-stations are propagated along the active topology by exploiting a distributed protocol. The UNI is located in between the end-stations and the Bridge over which they are connected in the topology. IEEE 802.1Qdd amendment is working on the Resource Allocation Protocol (RAP) that is exploiting a Link Registration Protocol (LRP) underlay transport to support the fully distributed case.

Centralized Network/Distributed User Model: The key element in this model is the Centralized Network Configuration (CNC) entity. A CNC has the complete knowledge of the network topology and of all the streams in the network. It is responsible for configuring TSN features and performing complex operations required for Time-Aware Shaper (TAS), Frame Preemption, etc., at the Bridge using a remote network management protocol (like NETCONF, YANG). The UNI is still located in between the end-stations and the Bridge. However, the Bridge at the edge of the network (connected to an end-station) communicates the user requirements to the CNC directly in this model.

Fully Centralized Model: The fully centralized model considers another entity called Centralized User Configuration (CUC). The CUC is responsible for the discovery of end-stations, retrieval of end-station capabilities, and configuration of TSN features in the end-stations. The difference from the centralized Network/distributed user model is that in this model the communication and exchange of user requirements take place between the CNC and CUC i.e., the TSN UNI exists between the CNC and the CUC. The CUC retrieves the requirements from the end-stations and exchanges this information with the CNC through the UNI.

IEEE 802.1Qcw is an amendment that specifies YANG data models specifically for Scheduled Traffic, Frame Preemption, and Per-Stream Filtering and Policing and can be used to configure the TSN bridges.

In some implementations, the fully centralized case is utilized for the integration of TSN with the 5G System (5GS). Centralized control and management of the transport network offers important vantage points against the distributed alternative. The reason is that a centralized SDN-based system for the transport network (either fronthaul, midhaul, or backhaul) can be easily incorporated into the existing 3GPP management and control systems. It can also be a part of an end-to-end orchestrated solution, while also expose TSN capabilities to the network slicing management systems.

IEEE 802.1CM provides a TSN profile for the mobile fronthaul network. IEEE 802.1CM describes how to meet the stringent fronthaul requirements in an Ethernet-based bridged network. In 802.1CM, both CPRI and eCPRI protocols are supported (Class 1 and Class 2 respectively). In both cases the following types of data are considered: a) User Data; b) Control and Management Data; and c) Synchronization Data. For example, for Class 2 (eCPRI), the maximum end-to-end one-way latency is 100 μs for high priority user plane data traffic between eREC and eRE. Moreover, 802.1CM mentions the components that contribute to the worst-case latency for a single hop from a bridge to a bridge. 802.1CM also discusses how the time synchronization requirements can be met for Precision Time Protocol (PTP) enabled devices.

FIG. 1 schematically illustrates one implementation of a network control system 107 of a time-sensitive network (TSN) 100, which is implemented in accordance with the standards and techniques discussed above. The components shown in FIG. 1 represent hardware circuitry that includes and/or is connected with one or more processors (e.g., one or more microprocessors, field programmable gate arrays, and/or integrated circuits) that operate to perform the functions described herein. The components of the network system 100 can be communicatively coupled with each other by one or more wired and/or wireless connections. Not all connections between the components of the network system 100 are shown herein.

The network system 100 includes several nodes 105 formed of network switches 104 and associated clocks 112 ("clock devices" in FIG. 1). While only a few nodes 105 are shown in FIG. 1, the network system 100 can be formed of many more nodes 105 distributed over a large geographic area. The network system 100 can be an Ethernet network or a wireless 3G/4G/5G network configured with TSN capabilities. The network system 100 communicates data signals along, through, or via links 103 between devices 106 (e.g., computers, control systems, user equipment, mobile devices, etc.) through or via the nodes 105. The data signals are communicated as data packets or frames sent between the nodes 105 on a schedule of the network system 100, with the schedule restricted what data signals can be communicated by each of the nodes 105 at different times. For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 107 includes a time-aware scheduler device 102 that enables each interface of a node 105 to transmit an data frame (e.g., between nodes 105 from one computer device 106 to another device 106) at a prescheduled time, creating deterministic traffic flows while sharing the same media with legacy, best-effort data traffic. The time-sensitive network 100 has been developed to support hard, real-time applications where delivery of frames of time-critical traffic must meet tight schedules without causing failure, particularly in life-critical industrial control systems. The scheduler device 102 computes a schedule that is installed at each node 105 in the network system 100. This schedule dictates when different types or classification of signals are communicated by the switches 104.

The scheduler device 102 remains synchronized with a grandmaster clock device 110 as clock instability results in unpredictable latency when frames are transmitted. The grandmaster clock device 110 is a clock to which clock devices 112 of the nodes 105 are synchronized. A consequence of accumulated clock drift is that a frame misses a time window for the frame, and must wait for the next window. This can conflict with the next frame requiring the same window.

A centralized network configurator device 108 of the control system 107 is comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102.

The topology knowledge of the network system 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedules. The configurator device 108 and/or scheduler device 102 can communicate the schedule to the different nodes 105.

A link layer discovery protocol can be used to exchange the data between the configurator device 108 and the scheduler device 102. The scheduler device 102 communicates with the time-aware systems (e.g., the switches 104 with respective clocks 112) through a network management protocol. The time-aware systems implement a control plane element that forwards the commands from the centralized scheduler device 102 to their respective hardware.

The Timing and Synchronization standard is an enabler for the scheduler device 102. The IEEE 802.1AS (gPTP) standard can be used by the scheduler device 102 to achieve clock synchronization by choosing the grandmaster clock device 110 (e.g., which may be a clock device 112 of one of the switch devices 104), estimating path delays, and compensating for differences in clock rates, thereby periodically pulling clock devices 112 back into alignment with the time that is kept by the grandmaster clock device 110. By pulling the clock devices 112 back into alignment with the grandmaster clock device 112, the use of phase locked loops (PLL) are not used in one implementation of the network system 100 due to the slow convergence of the loops and because the loops are prone to gain peaking effect.

The clock devices 112 can be measured by the configurator device 108 or the grandmaster clock device 110 periodically or otherwise repeatedly sending generalized time-precision protocol messages (gPTP). The operation consists mainly of comparing the timestamps of the time-precision protocol messages the transmits or receives of local switch device 104 with the timestamps advertised by neighbor switch devices 104. This way, any factors affecting clock drift are correctly detected by the protocol.

A clock device 112 that is suddenly pulled into the past or moved to the future relative to the time kept by the grandmaster clock device 110 can impact the local execution of a time-aware schedule. For example, time-critical traffic may not be communicated by the node 105 that includes the non-synchronized clock device 112 within the scheduled time period for time-critical traffic. The gPTP standard provides a continuous and monotonically increasing clock device 112. Consequently, the scheduler device 102 relies on a clock device 112 that cannot be adjusted and alignment of the clock device 112 is based on logical syntonization, offset from the grand master clock device 110, the link propagation delays with the neighbors, and the clock drifts between the local clock devices 112.

The IEEE 802.1AS standard can be used to detect intrinsic instability and drift of a clock device 112. This drift can occur for a variety of reasons, such as aging of the clock device 112, changes in temperature or extreme temperatures, etc. Relativistic effects from the theory of special and general relativity can be viewed as an extrinsic clock drift and can encompass gravitational and motion time dilation. For example, two clock devices 112 with the same intrinsic parameters would detect no drift, but relativity would cause drift of the time kept by these clock devices 112 from the grandmaster clock device 110.

While general relativity can be rather complicated, gravitational time dilation is straight-forward to apply. In the equation that follows, G is the gravitational constant, M is the mass of the gravitational body in kilograms, R is the radius, or the distance from the center of the mass, in meters, and c is the speed of light in meters per second. Two clock devices 112, one located at a height of 100 m within the Earth's gravitational field and another at an infinite distance from a gravitational field, that is, experiencing no gravitation. Time passes slower within a gravitational field, so the hypothetical clock device 112 located at infinity would be the fastest known clock device 112. When one second has passed for the clock device 112 located at infinity, consider how much time has passed as measured by the clock near Earth. The time at infinity is denoted as T and the time on Earth as $T_0$. To determine how much time has passed on a clock device 112 at altitude h as compared to the passage of time measured on a clock at the surface of the earth, calculate the time dilation ratio at altitude h and divide this by the time dilation calculated at the surface of the earth, take the square root of the result and then multiply this calculated ratio by the time interval at the surface of the earth and the result of the calculation is the amount of time that has passed on the faster clock by 11 femtoseconds compared to the clock device 112 located higher in the field at altitude h.

$$T = \sqrt{\frac{1 - \frac{2GM}{(R+h)c^2}}{1 - \frac{2GM}{Rc^2}}} \, T_0 \qquad (1)$$

Clock drift induced by gravitational time dilation seems negligible at first glance. Particularly when the speed of transmission is of 1 Gbps. It means that, to make an data frame of 64 bytes miss its Time-Aware schedule, 672 ns of drift must have elapsed if it is considered that for the 20 bytes of preamble, start frame delimiter, frame check sequence and interframe gap, for a port speed of 1 Gbps. With a difference of height clock of 100 m within the network, such a drift can be obtained within two years of uninterrupted service.

In one implementation, the schedules provided by the configurator device 108 are relative to grandmaster time and may ignore time dilation. As a result, the schedules lose simultaneity. While neglecting time dilation can be done within an acceptable error margin, cases where error on the scheduler devices 102 due to relativity are important. That is, where error caused by clock drift at the nodes 105 can cause time-critical traffic to not be communicated within the scheduled time window for time-critical traffic at one or more of the nodes 105.

Several use cases involving pico-satellites or high-speed networks (for example, plane-to-ground transmissions, high speed train communications, smart cities interacting with cars in highways, etc.) subject to significant gravitational gradient are examples where relativity can cause significant drift in the scheduler device 102.

The systems and methods described herein define specific local guard bands that dynamically change size based on changes in the time dilation. The guard bands are determined as time periods and/or network bandwidths in which non-time-critical data frame traffic cannot be communicated through the node or nodes that are allocated or assigned the guard bands.

Figure 2:
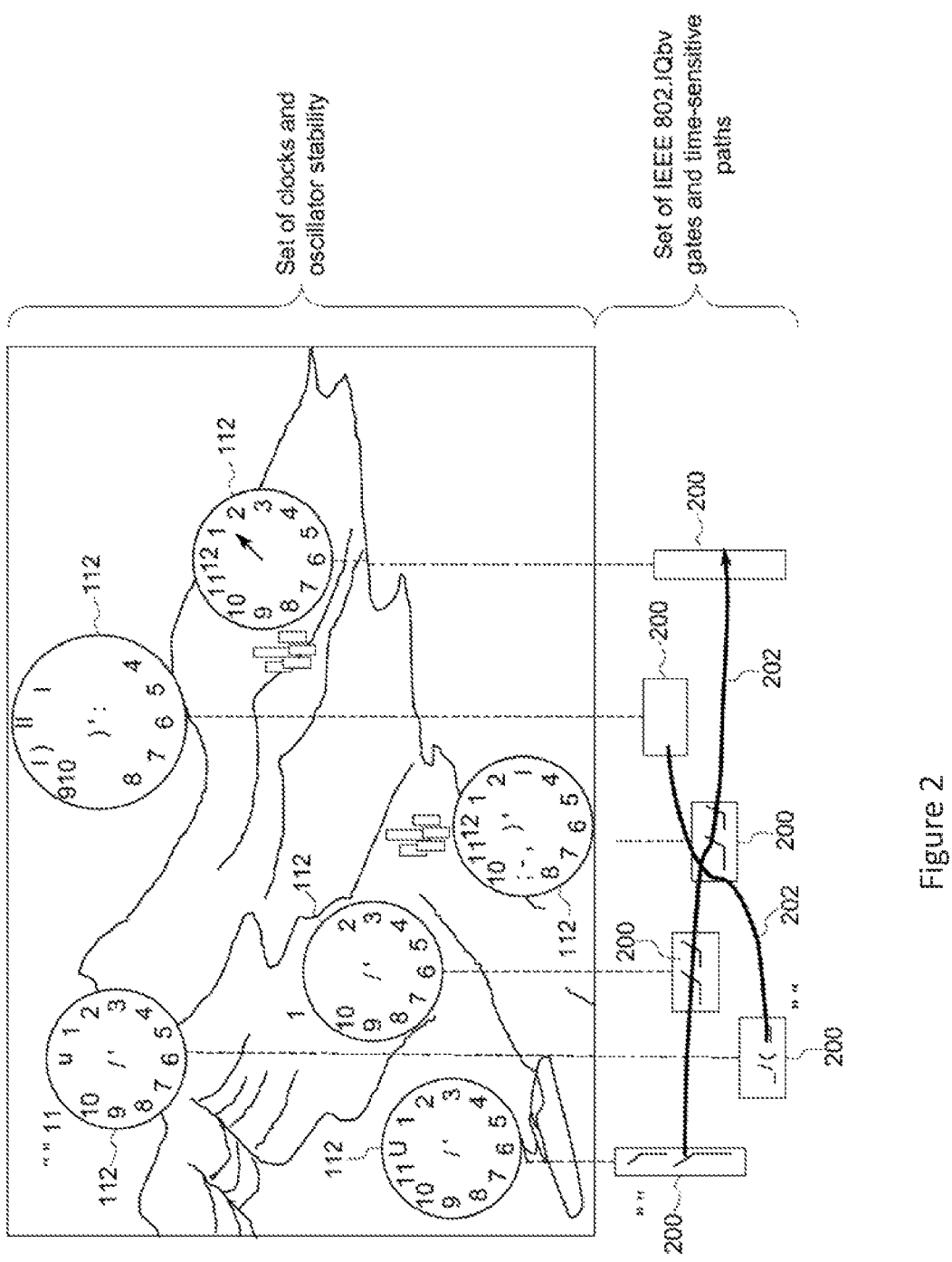
FIG. 2 illustrates a high-level concept behind the analysis described herein.

FIG. 2 schematically illustrates a high-level concept behind the analysis described herein. A network of clock devices 112 represented at the top of FIG. 2 are assumed to synchronize imperfectly with one another due to time dilation. The clock devices 112 provide timing for corresponding systems of IEEE 802.1Qbv gates 200 represented at the bottom of FIG. 2. These gates 200 can represent the nodes 105 of the network system 100 shown in FIG. 1. Time-sensitive data flows 202 of data frames between the gates 200 also are shown in FIG. 2. Clock devices 112 may never perfectly synchronize and synchronization error has an impact on the ability of time sensitive network flows 202 to operate correctly.

Time-sensitive data flows 202 cross diverse local time references and are subject to time dilation that cannot be measured by the gPTP standard. For example, FIG. 2 shows clock devices 112 located in different altitudes, and subject to different relativities. The clock devices 112 located in the mountains, for example, are synchronized to the grand master relative time (e.g., of the grandmaster clock device 110 shown in FIG. 1), but time-sensitive network data flows 202 reaching the clock devices 112 are "accelerating" because of time dilation. The configurator device 108 shown in FIG. 1 can prevent or correct for this acceleration by applying compensation on the configuration of the scheduler device 102. This compensation can occur by determining a guard band to be applied for communication of data flows at one or more of the nodes 105 or gates 200. This guard band can dynamically change as the compensation needed to correct for clock drift changes over time.

To compute the impact of time-sensitive network timing error, the scheduler device 102 computes schedules for network bridges (e.g., switches 104). The scheduler device 102 can use a heuristic approach that is non-deterministic polynomial-time hardness (NP-hard). The schedules can be computed by assuming that individual clock error is independent and normally distributed. The clock devices 112 may drift with a mean p and have a variance σ. Each gate system 200 can receive or determine time from one of the distributed clocks 112 that is synchronized by the IEEE 802.1AS standard.

Time-sensitive data flow paths are scheduled by the centralized scheduler device 102 assuming perfect synchronization. If clock synchronization fails to achieve a sufficient degree of synchronization, this failure could cause multiple data frames from different time-sensitive network flows 202 to be simultaneously transmitted on the same link. This would cause an alternate scheduling mechanism to mitigate potential collision and frame loss at the expense of an unnecessary and unpredictable delay in transmission. Thus, in the presence of synchronization error, data frames in time-sensitive network flows 202 will have a probability of exceeding their maximum, deterministic latency requirement and suffer significant jitter. Under certain synchronization errors, it may even be possible for data frames to completely miss scheduled transmission window time and catch another open window, thus impacting other time-sensitive network flows 202 that were initially scheduled on different time windows. A guard band can be dynamically calculated and added to the schedules to mitigate clock error and ensure that time-critical traffic is successfully communicated. This provides at least one technical effect of the subject matter described herein. Dynamically altering the guard band can ensure that packets (that are needed to be delivered at certain designated times to ensure the same operation of systems using the time-sensitive network) are delivered on time, even with drift of clocks away from the grandmaster clock and/or other differences between the times tracked by the clocks and the master time maintained by the grandmaster clock.

In one implementation of the subject matter described herein, the scheduler device 102 is provided the details of a network system 100 (shown in FIG. 1) and requested time-sensitive network flows 202 and computes schedules for each flow 202. While the scheduler device 102 is designed to operate with networks 100 and manually crafted time-sensitive network flows 202, one component for this analysis is the ability to randomly generate large numbers of time-sensitive network flows 202 in a large, randomly generated network 100. Thus, the scheduler device 102 is able to analyze large, complex time-sensitive network schedules in large, complex networks 100.

Random jitter can be unpredictable and is assumed to be Gaussian (e.g. thermal noise). Deterministic jitter can be predictable and bounded (e.g., duty cycle, distortion, and inter-symbol interference). Clock jitter can have a Gaussian distribution. Jitter and parts-per-million (PPM) are related by $$df = \frac{f}{10^6}\text{PPM},$$

where f is the center frequency of an oscillator and df is the maximum frequency variation. In one implementation, the clock devices 112 can be assumed by the scheduler device 102 to have an accuracy of +/−100 PPM with 5 picoseconds of root mean square (RMS) jitter. The RMS error can be related to Gaussian variance by $\sigma_n/\sqrt{2N}$, where N is the number of samples (e.g., 10,000) and peak-to-peak period jitter equals +/−3.72 RMS jitter.

One part of the analysis performed by the scheduler device 102 examines how jitter propagates from one clock device 112 to another clock device 112. Random noise can be added by the scheduler device 102, while correlation in noise reduces the purely additive characteristic and creates additional uncertainty. The scheduler device 102 can propagate clock drift and jitter from the grandmaster clock device 110 through all other (e.g., slave) clock devices 112. For example, the other clock devices 112 can be repeatedly synchronized with the grandmaster clock device 110. The model also considers the fact that path delay reduces the ability of the gPTP standard to keep slave clock devices 112 synchronized with the grandmaster clock device 110. The scheduler device 102 implementation enables experimentation with clock accuracy and placement and determines the impact of clock accuracy experimentation on time-sensitive network scheduling.

In some implementations, TSN functionalities and techniques described above with respect to the TSN 100 may be integrated in a 5G system or network, which also supports network slicing techniques and processes discussed below. In a 5G system, the core components are the 5G Core Network (5G-CN) and the Radio Access Network (5G-RAN).

The 5G-CN is based on a Service-Based Architecture (SBA) comprising a set of interconnected Network Functions (NFs) like Session Management Function (SMF), Access and Mobility Management Function (AMF), Application Function (AF), and User Plane Function (UPF). Key functionalities are summarized in Table 2. The 5G architecture is defined in 3GPP TS 23.501, TS 23.502 contains the relevant procedures and TS 23.503 describes the relevant Policy, Control, and Charging architecture.

TABLE 2

| |
|---|
| SMF: responsible for controlling the life-cycle of Protocol Data Unit (PDU) sessions, according to the respective network policy. |
| AMF: responsible for connection and mobility management. |
| AF: is the entry point used to allow the exposure of and interaction with 5G Network resources. It is used for traffic description and traffic steering and interacts with the Policy and Control Framework (PCF). |
| UPF: responsible for the forwarding of user traffic and connectivity to the Data Network (DN). Also responsible for per-flow QoS handling, including transport level packet marking for uplink (UL)/downlink (DL) traffic and rate limitation. |

In 5G-RAN, the base station called gNodeB handles RAN-related functionalities similar to the eNodeB in 4G. In a 5G-RAN, the next generation eNodeB is usually denoted as gNB. The term ng-eNodeB is used to denote an LTE eNobeB that can also be connected to a 5G-Core. A 5G-RAN can comprise of gNBs or/and ng-eNodeBs. Cloud-RAN (C-RAN) is a technique introduced to decouple the radio part and the base-band processing part. In C-RAN, the Remote Radio Heads (RRHs) are responsible for the lower layer PHY functions (Radio Frequency (RF), signal amplification, D/A, and A/D conversion), while the base-band processing and the higher layer protocols are performed in a centralized pool of Base Band Units (BBUs). The link between an RRH and a BBU is denoted as fronthaul.

Despite the advantages introduced by C-RAN in terms of cloudification and SDN/NFV-awareness, its fundamental need for extreme bandwidth on the fronthaul link makes its practical deployment difficult. The functional split concept was introduced to relocate RAN functions (like modulation/demodulation) from the centralized BBU pool to the RRHs. Furthermore, a single BBU can be further subdivided into a centralized entity where for example, the PDCP layer is processed, and an entity where for example, the RLC/MAC functions are executed. The PHY layer is handled in the Radio Unit (RU), while a BBU can be decomposed into Centralized and Distributed Units (CUs and DUs respectively) to flexibly deploy RAN functions on different locations (cloud sites). Table 3 summarizes terminologies adopted by 3GPP for various components of a 5G system.

TABLE 3

| |
|---|
| Low Layer Split (LLS): split between RU and remaining RAN protocols. |
| High Layer Split (HLS): split between DU and CU protocols. |
| Radio Unit (RU): processes all protocol layers below LLS. |
| Distributed Unit (DU): processes protocol layers between LLS and HLS. |
| Centralized Unit (CU): processes all protocol layers above HLS and terminates inter-RAN interfaces. Aggregates several DUs. The CU can be separated into one Control Plane (CU-CP) and one or more User Planes (CU-UP). E1 is the interface between CU-UP and CU-CP. Together, they form the gNB-CU. The RU plus DU represents the gNB-DU. It can be regarded as evolution of the eNodeB. |

Network slicing allows a network operator to provide dedicated virtual networks with functionality specific to the service or customer over a common network infrastructure.

Thus, network slicing supports numerous and varied services (enhanced Mobile Broadband (eMBB), Massive Internet of Things (IoT), and Ultra-Reliable Low Latency Communication (URLLC) to Vehicular to everything communication (V2X)). More specifically, network slicing is a form of virtual network architecture using principles behind software defined networking (SDN) and network functions virtualization (NFV) in fixed networks. SDN and NFV deliver network flexibility by allowing traditional network architectures to be partitioned into virtual elements that can be linked (additionally or alternatively through software).

Figure 3:
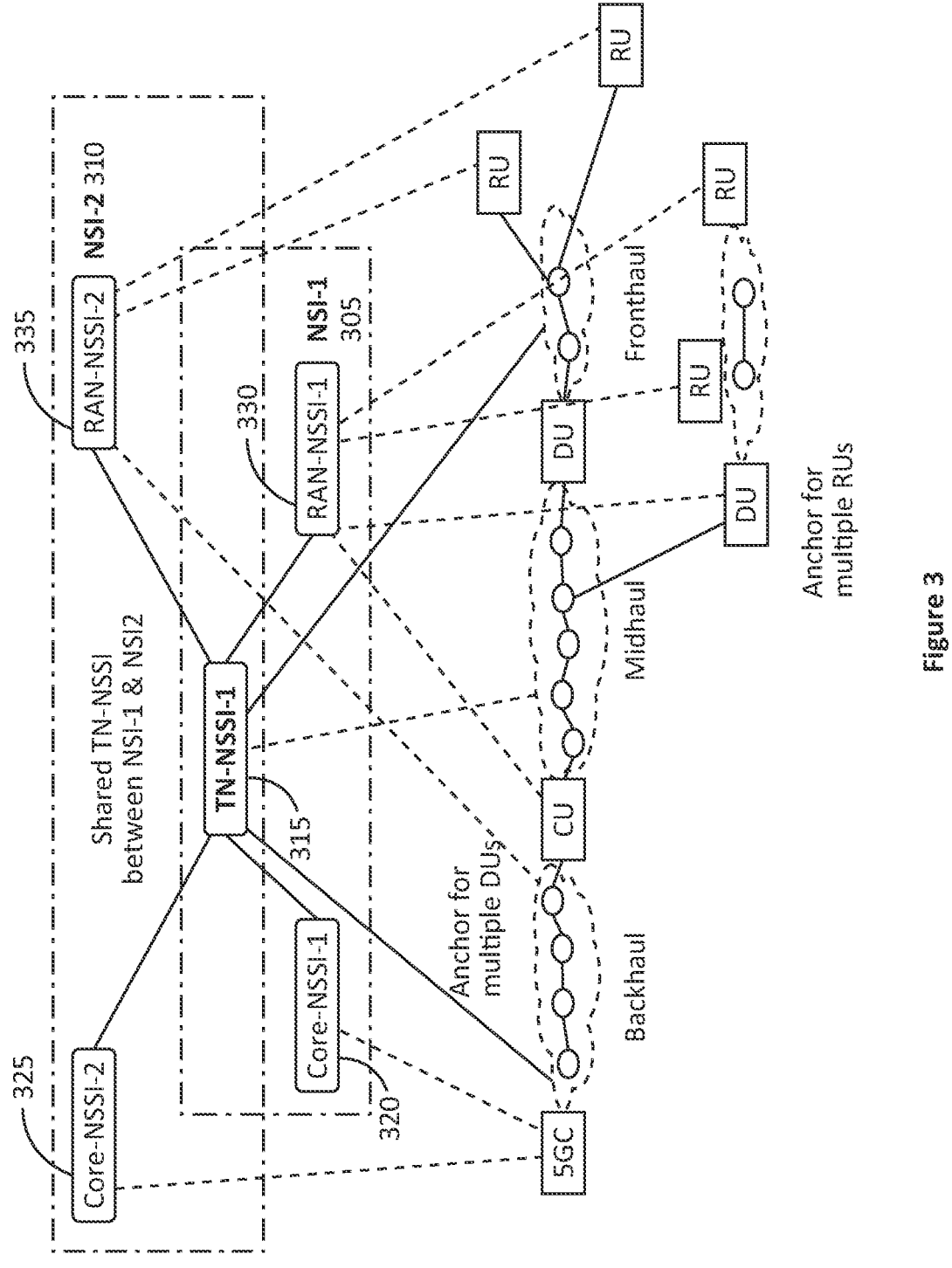
FIG. 3 illustrates one implementation of a 5G system with network slicing.

A realization of a network slice is called Network Slice Instance (NSI). An end-to-end NSI may be composed of Sub-network Instances (NSSIs), where a single NSSI may be shared by multiple NSIs. For example, an end-to-end NSI is composed of a RAN-NSSI connected to a 5G-Core NSSI through a Transport Network NSSI (TN-NSSI). As an example, in FIG. 3, a 5G system 300 with network slicing implemented thereon is shown. Two end-to-end NSIs (NSI-1 305 and NSI-2 310) are shown depicting two network slices implemented through the entire network 300. In this example, a TN-NSSI 315 is shared between the NSIs 305 and 310, while having individual Core-NSSIs 320, 325 and RAN NSSIs 330, 335 for the NSIs 305 and 310, respectively. A summary of the key terms used in network slicing is provided in Table 4.

TABLE 4

| Term | Message |
|---|---|
| Tenant | Represents an organization, agency, application, or business entity that is entitled to access the service and get guaranteed network resources through pre-defined Service Level Agreements and Policies with the network operator. In this paper, it is assumed, that a tenant can own multiple network slices. |
| Service Instance | An instance of an end-user service that is realized within or by a Network Slice. |
| Network Slice Instance (NSI) | Set of network functions and their corresponding resources which are arranged and configured to form a complete logical network to meet certain requirements of the Service Instance(s). |
| Sub-network Instance (NSSI) | Set of network functions and their corresponding resources which are arranged and configured to form a logical network. The Sub-network Instance is defined by a Sub-network Blueprint (TR 23.799). A Sub-network Instance is not required to form a complete logical network. A Sub-network Instance might be shared by two or more Network Slices. |
| Network Slice Blueprint | A complete description of the structure, configuration and the plans/work flows for instantiating and controlling the NSI during its life cycle. The Network Slice is described by a Network Slice Template (NST). The NSI is created by using the NST and instance-specific information. |
| Sub-Network Slice Blueprint | A Sub-network Blueprint refers to physical and logical resources and may refer to other Sub-network Blueprints. Network slice subnet template: description of the structure (and contained components) and configuration of the network slice subnet. |

Network slicing allows multiple virtual networks to be created on top of a common shared physical infrastructure. The virtual networks may be customized to meet the specific needs of applications, services, devices, customers or operators.

In the case of time sensitive networks using the principles described above with reference to network system 100 (e.g., Ethernet, 5G, and so forth), a single physical network may be sliced into multiple virtual networks that can support different radio access networks (RANs), or different service types running across a single RAN. As such, network slicing may be implemented across the whole 5G network, i.e., implemented through the RAN as well as in the core network of the 5G network.

In one network slicing example, an autonomous car may rely on V2X (vehicle-to-anything) communication which requires low latency but not necessarily a high throughput. A streaming service watched while the car is in motion may require a high throughput and is susceptible to latency. Both would be able to be delivered over the same common physical network on virtual network slices to optimize use of the physical network.

Network slicing maximizes the flexibility of time sensitive networks, optimizing both the utilization of the infrastructure and the allocation of resources. This enables greater energy and cost efficiencies compared to earlier time sensitive networks.

Each virtual network (network slice) comprises an independent set of logical network functions that support the requirements of the particular use case, with the term 'logical' referring to software.

Each virtual network may be optimized to provide the resources and network topology for the specific service and traffic that will use the slice. Functions such as speed, capacity, connectivity and coverage may be allocated to meet the particular demands of each use case, but functional components may also be shared across different network slices.

Each virtual network may be completely isolated so that no slice can interfere with the traffic in another slice. This lowers the risk of introducing and running new services, and also supports migration because new technologies or architectures can be launched on isolated slices. Network slicing also has a security impact, because if a cyber-attack breaches one slice the attack is contained and not able to spread beyond that slice.

Each network slice may be configured with its own network architecture, engineering mechanism, and network provisioning. Each network slice may typically contain management capabilities, which may be controlled by the network operator or the customer, depending on the use case. Each network slice may be independently managed and orchestrated. The user experience of each network slice may be the same as if the slice were a physically separate network.

Regarding end-to-end Network Slice Management, 3GPP defines the following key management entities in TR 28.801 regarding the orchestration of NSIs and NSSIs:

Communication Service Management Function (CSMF): Responsible for translating the communication service requirements to network slice requirements.

Network Slice Management Function (NSMF): for the end-to-end (E2E) management and orchestration of the NSI.

Network Slice Subnet Management Function (NSSMF): Responsible for the management and orchestration of the sub-network slice instance in a specific domain, e.g., the RAN-NSSMF and the Core-NSSMF are responsible for the management of the RAN and the CN sub-network slice instances respectively and the TN-NSSMF is responsible for the orchestration and management of the Transport Network (TN) sub-network slice instance.

Figure 4:
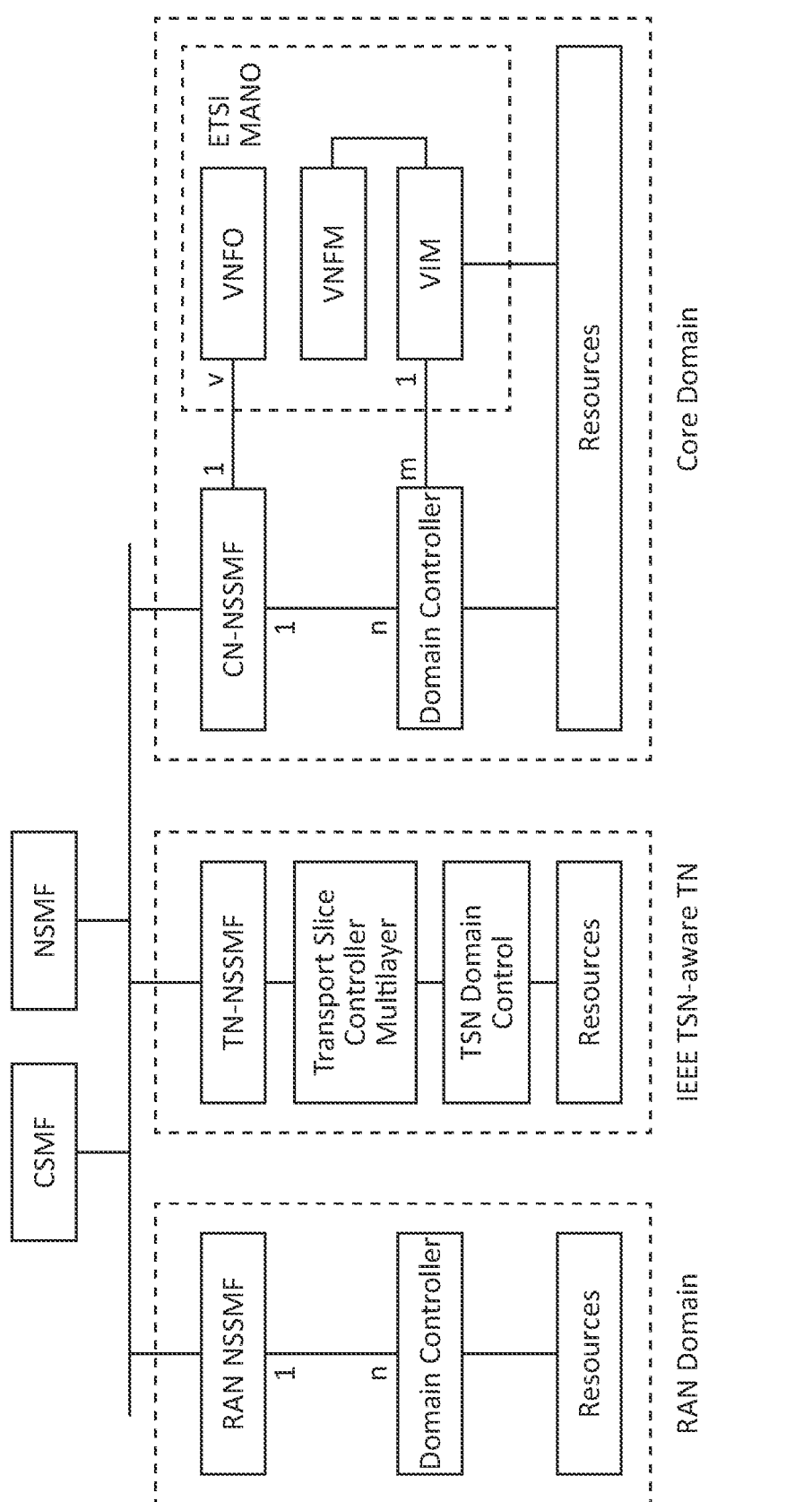
FIG. 4 illustrates interactions between the different management entities in a network in accordance with some implementations of this disclosure.

FIG. 4 shows the interactions between the different management entities. For the 5G core, the ETSI MANO architecture can also be incorporated. It is used for the management of both the physical and the virtual network resources and services (VNFs). The Network Slice life-cycle management aspects are described in 3GPP specifications including TR 28.801, TS 28.530, TS 28.531, and TS 28.533. For example, in TS 28.530 the Network Slice as a Service (NSaaS) concept is described including the requirements for the transition to a service-based slice management architecture. In 3GPP TS 28.533, the network slice management entities are part of a service-based solution.

Figure 5:
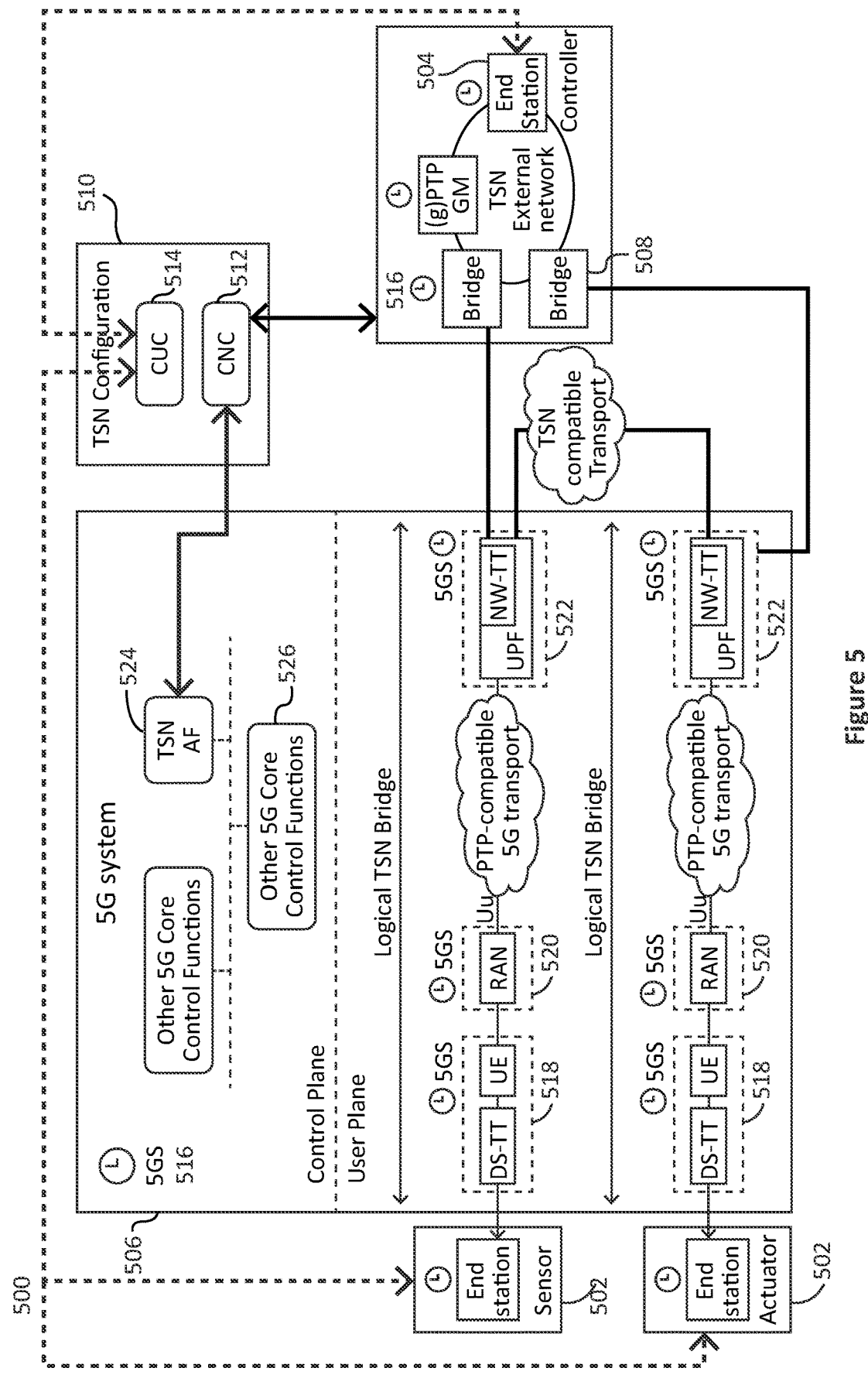
FIG. 5 illustrates one implementation of an integrated TSN-5G system.

FIG. 5 is a diagram of a 5G system 500 integrated with time sensitive network (TSN) components providing end-to-end deterministic connectivity. 5G aspects (e.g., supporting ultra-reliable low-latency communication (URLLC)) and TSN features may be combined and integrated to provide deterministic connectivity end to end, such as between input/output (I/O) devices and their controller potentially residing in an edge cloud for industrial automation. Such an integration may include support for both base-bridging features and TSN add-ons.

FIG. 5 illustrates one implementation of a conventional integrated TSN-5G system 500 in which a 5G system 506 is configured to be emulated as a single TSN component (e.g., a TSN bridge). Overall, the system 500 is configured as a deterministic TSN system to communicate data between end-devices, e.g., input/output (I/O) devices 502 and a controller 504, via the 5G system 506 (emulating as a TSN bridge) and one or more TSN bridges 508 and using a TSN controller 510. The system 500 is configured based on standard methods for time synchronization and traffic management, allowing deterministic TSN-based communication in accordance with TSN standards and techniques discussed above.

In some implementations, centralized Network Configuration (CNC) 512 can be applied to the network devices (bridges, e.g., the 5G system bridge 506, bridges 508), whereas, Centralized User Configuration (CUC) 514 can be applied to user devices (end stations, e.g., the I/O devices 502). The fully centralized configuration model follows a software-defined networking (SDN) approach. In other words, the CNC 512 and the CUC 514 in the controller 510 provide the control plane instead of distributed protocols. In contrast, distributed control protocols are applied in the fully distributed model, where there is no CNC or CUC.

To achieve desired levels of reliability, TSNs employ time synchronization, and time-aware data traffic shaping. The data traffic shaping uses the schedule to control gating of transmissions on the network switches and bridges (e.g., nodes). In some aspects, the schedules for such data traffic in TSNs can be determined prior to operation of the network. In other aspects, the schedules for data traffic can be determined during an initial design phase based on system requirements, and updated as desired. For example, in addition to defining a TSN topology (including communication paths, bandwidth reservations, and various other parameters), a network-wide synchronized time for data transmission can be predefined. Such a plan for data transmission on communication paths of the network is typically referred to as a "communication schedule" or simply "schedule." The schedule for data traffic on a TSN can be determined for a specific data packet over a specific path, at a specific time, for a specific duration. A non-limiting example of a technique for generating schedule for TSN data traffic is discussed in U.S. application Ser. No. 17/100,356, which is incorporated herein in its entirety by reference.

Time-critical communication between end devices or nodes (e.g., the I/O devices 502 and the controller 504) in TSNs includes "TSN flows" also known as "data flows" or simply, "flows." For example, data flows can comprise datagrams, such as data packets or data frames. Each data flow is unidirectional, going from a first originating or source end device (e.g., the I/O device 502) to a second destination end device (e.g., the controller 504) in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a set of data flows between the inter-connected devices or nodes can be defined. For example, the set of data flows can be between the interconnected devices. For the set of data flows, various subsets or permutations of the dataflows can additionally be defined. Further, time-critical communication between end devices or nodes in TSNs includes "TSN streams" or "streams," where each TSN stream may originate at a specific talker node intended to be communicated to one or more listener nodes. As such, each TSN stream may include one or more data flows, where each data flow is between the talker node (where the TSN stream originated) and a listener node.

Both end devices (e.g., 502, 504) and switches (commonly called "bridges" or "switching nodes") (e.g., 506, 508) transmit and receive the data (in one non-limiting example, Ethernet frames) in a data flow based on a predetermined time schedule. The switching nodes and end devices must be time-synchronized to ensure the predetermined time schedule for the data flow is followed correctly throughout the network. For example, in FIG. 5, the clocks 516 represent that the various switching nodes and end devices in the TSN system 500 (including in the 5G system 506) are be time-synchronized with reference to a global clock (grandmaster clock timing). In some other aspects, only the switches can transmit the data based on the predetermined schedule, while the end devices, for example legacy devices, can transmit data in an unscheduled manner.

The data flows within a TSN can be scheduled using a single device (e.g., the controller 510) that assumes fixed, non-changing paths through the network between the talker/listener devices and switching nodes in the network. Alternatively, the data flows can be scheduled using a set of devices or modules. The scheduling devices, whether a single device or a set of devices, can be arranged to define a centralized scheduler. In still other aspects, the scheduler devices can comprise a distributed arrangement. The TSN can also receive non-time sensitive communications, such as rate-constrained communications. In one non-limiting example, the scheduling devices can include an offline scheduling system or module.

In some implementations, the I/O end device 502 may be, in various aspects, a complex mechanical entity such as the production line of a factory, a gas-fired electrical generating plant, avionics data bus on an aircraft, a jet engine on an aircraft amongst a fleet (e.g., two or more aircraft), a digital backbone in an aircraft, an avionics system, mission or flight network, a wind farm, a locomotive, etc. In various implementations, the I/O end device 502 may include any number of end devices, such as sensors, actuators, motors, and software applications. The sensors may include any conventional sensor or transducer, such as a camera that generates video or image data, an x-ray detector, an acoustic pick-up device, a tachometer, a global positioning system receiver, a wireless device that transmits a wireless signal and detects reflections of the wireless signal in order to generate image data, or another device.

Further, the actuators (e.g., devices, equipment, or machinery that move to perform one or more operations of the I/O device 502) can communicate using the TSN system 500. Non-limiting examples of the actuators may include brakes, throttles, robotic devices, medical imaging devices, lights, turbines, etc. The actuators can communicate status data of the actuators to one or more other devices (e.g., other I/O devices 502, the controller 504 via the TSN system 100). The status data may represent a position, state, health, or the like, of the actuator sending the status data. The actuators may receive command data from one or more other devices (e.g., other I/O devices 502, the controller 504) of the TSN system 500. The command data may represent instructions that direct the actuators how or when to move, operate, etc.

In some implementations, the controller 504 can communicate a variety of data between or among the I/O end devices 502 via the TSN 500. For example, the control system 504 can communicate the command data to one or more of the devices 502 or receive data, such as status data or sensor data, from one or more of the devices 502. Accordingly, the controller 504 may be configured to control operations of the I/O devices 502 based on data obtained or generated by, or communicated among the I/O devices 502 to allow for, e.g., automated control of the I/O devices 502 and provide information to operators or users of the I/O devices 502. The controller 504 may define or determine the data flows and data flow characteristics in the TSN 500.

Referring now to the 5G system 506, the 5G system 506 is a wireless communication system used to carry TSN traffic between various TSN end devices, e.g., the I/O devices 502 and the controller 504. In some implementations, the 5G system 506 is configured to emulate as one TSN bridge per User Plane Function (UPF) (similar to TSN bridges 508, according to the TSN standards discussed above). The 5G system 506 may be a New Radio (NR) network implemented in accordance with 3GPP 23 and 38 series specifications (which are incorporated herein in their entirety), and integrated into the system 100 in accordance with the 3GPP Release 17 23.501 standard v17.1.1 and v17.2.0 (which are incorporated herein in entirety). As shown, the 5G system 506 may include, in the 5G user plane, User Equipment (UE) 518, RAN (gNB) 520, User Plane Function (UPF) 522, and in the 5G control plane, application function (AF) 524 and policy control function (PCF) 526, among other components. In some implementations, the 5G system 506 may be configured to provide an ultra-reliable low latency communication (URLLC) service.

In some implementations, 5G defines extra-robust transmission modes for increased reliability for both data and control radio channels. Reliability is further improved by various techniques, such as multi-antenna transmission based on multiple-input and multiple-output (MIMO) techniques, the use of multiple carriers and packet duplication over independent radio links.

As noted above, in the integrated system 500, the 5G system 506 is configured as one TSN (virtual) bridge per UPF. The 5G system 506 includes TSN Translator (TT) functionality for the adaptation of the 5G system 506 to the TSN domain, both for the user plane and the control plane, hiding the 5G system 506's internal procedures from the TSN bridged network. The 5G system 506 provides TSN bridge ingress and egress port operations through the TT functionality. For instance, the TTs support hold and forward functionality for de-jittering. FIG. 5 illustrates the case when the 5G system 506 connects an end station 502 to a bridged network 508; however, the 5G system 506 may also interconnect bridges 508.

In several implementations of the present disclosure, 5G network slicing is implemented, e.g., within the system 500, by transporting data for individual network slices over separate and distinct time-sensitive network (TSN) streams wherever possible within the 5G system 506. For example, network slices using NSIs 305 and 310 may be implemented within the 5G system 506 such that data for the NSI 305 is communicated over a first TSN stream or flow and data for the NSI 310 is communicated over a second TSN stream or flow, which is distinct, isolated, and separate from the first TSN stream or flow. This provides benefits of isolating network slices from each other and enabling custom priority to individual network slices by controlling the TSN scheduling of those slices within the 5GS. Network slicing may also require logical abstractions of network resources and their configuration, management, and control using software-defined networking (SDN) and network function virtualization (NFV). Management and control of 5G network slices is a time-sensitive operation that may also benefit from the TSN implementation within the 5G system. Thus, this disclosure integrates TSN into management and control of 5G network slices as well as a transport method for data flowing through network slices.

Figure 6:
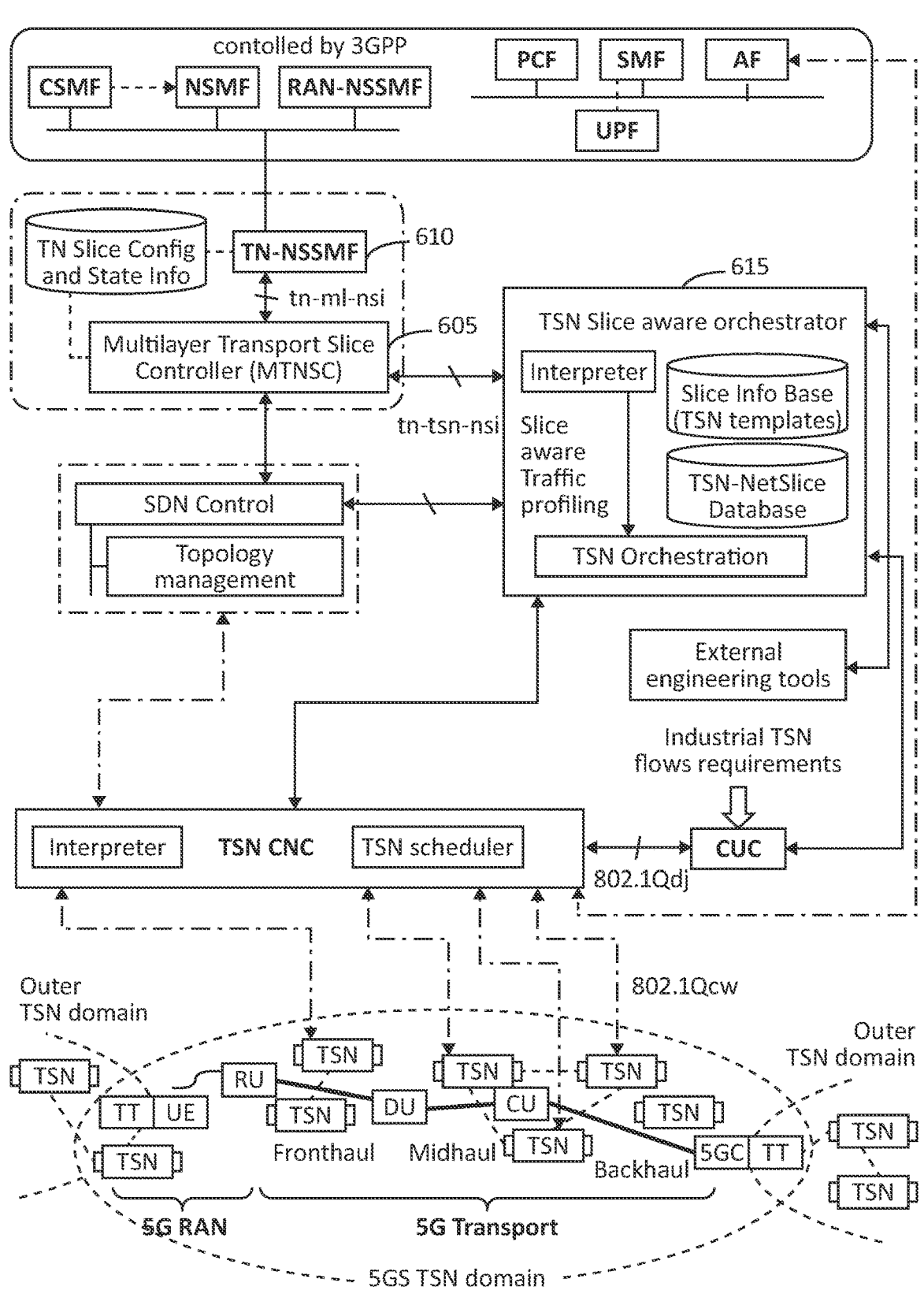
FIG. 6 illustrates one implementation of a system architecture of an integrated TSN-5G system.

Referring now to FIG. 6, which illustrates a system architecture of an integrated TSN-5G system 600 (e.g., as discussed above with respect to FIG. 5) with network slicing implemented thereon. This architecture includes that a Multilayer Transport Network Slice Controller (MTNSC) 605 exists, interacting a) with a transport slice management entity of the mobile network (TN-NSSMF) 610 through interface tn-ml-nsi (according to the YANG definition); and b) with the TSN control plane through a second interface tn-tsn-nsi. A TSN slice-aware orchestrator 615 may be responsible to orchestrate the creation of TSN network slices and support their entire life-cycle management. In more detail, through interaction with the MTNSC 605, the TSN orchestrator 615 is responsible for:

handling TSN-TN network slice requirements information.

handling slice aware TSN TN-NSSI stream specification.
  TSN-TN slice instance creation.
  handling TSN-TN slice instance state information.
  handling TSN-TN slice instance policy information.
  handling TSN-TN slice instance configuration information.

monitoring TSN-TN slice instance running state.
  TSN-TN slice instance decommissioning actions.
  exposing soft or hard TSN slice instance capabilities to MTNSC.

driving the creation of soft or hard TSN slice instance based on the overall network state/slice requirements.
  receiving TN slice isolation requirements from MTNSC.

For example, the TSN control plane entity may support preserving slice isolation over a converged TSN-based data plane using specific schedulers and Gate Control Lists (GCLs) when 802.1Qbv is used. TSN support on a per slice basis may require that the TN NSSI instance is created and activated before the streams (corresponding also to 5G sessions) really pass through the network. This means that the TSN control plane needs to perform decision-making with different time scales, one at NSSI provision time (without necessarily having full knowledge of all the flows passing through the TSN network) and one according to traditional CNC/CUC operations and workflows.

The TSN slice orchestrator 615 interacts with the rest of the TSN control plane entities, namely CNC/CUC, in a network slice aware manner in order to realize the creation of TSN TN-Network Slice Subnetwork Instance (NSSI). The TSN orchestrator 615 is the control and management entity that also interacts with SDN control (L2/L3/L4/topology, etc.), and the MTNSC 605 in order to orchestrate TSN-NSSI and optimize the TSN slice-aware and slice-unaware operations. Input to the TSN orchestration mechanism are as follows:

TSN slice-aware information/requirements/policies for network slices.

Per slice stream profiling—session dynamicity handling/filtering/aggregation.

Input from other network controllers or engineering tools, as TSN can be used as a converged network over which other traffic can pass concurrently with 5G flows.

The different components of the architecture 600 and their functionalities are detailed as follows:

TN-NSSMF: TN-NSSMF is responsible for the orchestration and management of the TN-NSSI counterpart.

E2e Slice-DB: this is a database infrastructure with all the TN-NSSI information. This database is used to store all the information regarding NSI state, NSI templates, reserved resources, network functions, and configurations.

Multilayer Transport Network Slice Controller (MTNSC): this entity communicates with TN-NSSMF in order to control the different network control elements used to deliver the transport slice service. Note, that the control plane functionalities for the TN are provided by one or more domain controllers that are interacting with the TN-NSSFM through the MTNSC. For example, a different domain controller can be used to control the fronthaul network and a different one for the back-haul network. Different domain controllers can also be assigned to control different administration domains. One control entity for example, could be responsible for L2/L3 aspects and another for topology discovery or IP configuration. From an implementation perspective, a single software solution (like an SDN controller) could support all the necessary functionalities; a domain controller can be SDN-based.

TSN-NetSiceDB: The database infrastructure with all the TSN TN NSSIs' state information. This database infrastructure is not controlled by 3GPP. It is used to store all the information regarding identification and mappings between NSI and NSSI, store the TSN TN NSSI state, templates, reserved resources, network functions, configurations, etc. It is also the entity where TSN TN NSSI operation and management information are stored. For every network element or network service, we consider that for each TSN TN NSSI, only specific Operations, Administration, and Maintenance (OAM) information is stored at the TN-NSDB that is relevant only to this TSN TN NSSI.

Slice Aware/Slice Unaware CUC: To enable backward compatibility with the 5G black-box approach (as shown in FIG. 5), CUC initially parses slice unaware stream requirements from the different Talkers/Listeners. However, in case Network Slicing is enabled prior to sending to CNC the relevant stream TSpecs, stream requirements are passed through new tn-tsn-nsi interface to Transport Network Slice Controller to the management entities (like CSMF) responsible to describe the Slice requirements to NSMF. In case Network Slicing is not enabled, or in case all streams by default belong to a default network slice, the normal pipeline is followed and stream information is passed through 802.1Qdj to CNC and then to AF in order to make the resource reservation inside 5GS.

TSN-NSI Templates: A network slice template is used to describe the slice by means of resources, services, configurations, relationships, and service function chains required by the NSI. The network slice templates actually define all the details required by a network orchestrator to drive all the phases of the NSI life-cycle. For the TSN network, a new network slice template is required that is used to define the type of the NSSI like hard or soft slicing, shared or non-shared resources, traffic requirements, and QoS attributes.

Slice Info Base: The definition of such templates can be found in the Slice Info Base.

Slice aware/Tenant aware CNC: In principle, CNC receives input from CUC regarding configuration requests and network services like LLDP (or other tools) for topology information. Based on all this input scheduling, decision-making is performed for the whole network. However, according to current developments, there is no notion of tenant or slice to group different stream requests, in order to optimize the scheduling/forwarding decision. For all the stream requests made by the CUC, an additional tenant/slice identifier may also be used. After the CNC compiles the forwarding strategy (e.g., scheduling), this is applied to TSN-bridge devices through a management protocol (like NETCONF, RESTCONF, etc.).

TSN-aware TN-NEST. All the interfacing between the TSN control plane and the MTNSC is to be handled by a TSN orchestrator, used for message interpretation, while also for interfacing with other TN control systems to cope with complexity minimization and relevant optimization decision-making.

The identification of NSIs, TN-NSSIs, TN-resources, TN-NFs, TN-interfaces, etc., is an important topic towards NSMF and TN-NSSMF integration, in order to provide end-to-end NSIs. In 3GPP, different identifiers are used to realize the concept of network slicing such as the NeS-ID, S-NSSAI, Tenant-ID, Temporary-ID, Token, and Tracking Area Identity (TAI) defined in 3GPP TS 23.501, TS 23.502, TS 38.300.

In some implementations, TSN slice orchestrator 615 implements "commissioning" of a new 5G network slice within a currently operating TSN such that the network slice begins operation quickly and timely while avoiding disruption of ongoing TSN flows. As such, TSN slice orchestrator 615 may identify the network slice resources identified and reserve such resources for use in the network slice. Then the network slice is assembled and its AdminBaseTime (the absolute time at which the slice begins operation) is configured to be in phase with the TSN flows arriving from user applications. Accordingly, all TSN user information for a network slice (802.1Qbv parameters) are collected and analyzed before starting network slice operation. In some implementations, a common cycle time (e.g., AdminCycleTime) is considered to configure the 5G network slice to support each user TSN flow.

However, there may be a large number of different users connecting to the 5G network from different TSN domains and each user may have different cycle times with different schedules. This could result in an infeasibly large common cycle time. To address such a situation, an optimization technique may be used that finds a common cycle time that minimizes mean and variance of jitter to all users. Using TSN to marshal the 5G network slice resources is also of benefit, enabling the network slice to be created in a deterministic amount of time. Similarly, efficient and rapid decommissioning of a network slice is important in order to better utilize network resources.

Referring to FIG. 7, which shows a flowchart illustrating a method 700 of communication over a communication network, e.g., network or system 300, 500, and/or 600. The method 700 may be performed by one or more components of network or system 300, 500, and/or 600, and/or by other hardware/software components not shown in the figures.

At step 702, a plurality of network slices of the communication network (e.g., 5G system in FIG. 3, 5, or 6) may be determined based on a plurality of services supported by the communication network. Each of the plurality of network slices may be configured to support communication of data associated with at least one of the plurality of services (e.g., mobile communication, vehicle-2-vehicle communication, Internet of Things (IoT) communication, etc.).

At step 704, a plurality of data streams within the communication network. Each data stream may be configured in accordance with at least one of a plurality of time-sensitive network policies. For example, each data stream may be configured in accordance with TSN techniques and functionalities as described above, such that each data stream is an independent and distinct TSN data stream. In some implementation, the first time-sensitive network policy defines scheduling or latency parameters for data communication using the first data stream. In other implementations, the first time-sensitive network policy defines a priority order of data communication using the first data stream with respect to the other of the plurality of data streams.

Figure 8:
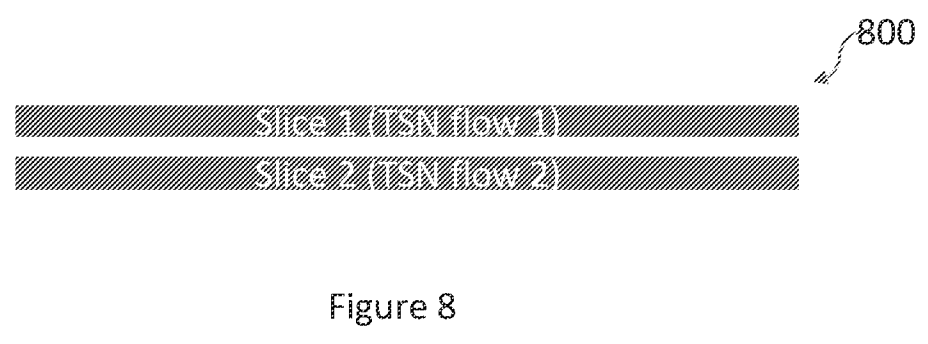

At step 706, a first data stream of the plurality of data streams corresponding to a first network slice of the plurality of network slices may be determined. For example, each TSN data stream may be correspond to one of the network slices in the 5G network implemented in system 300, 500 and/or 600 such that each TSN data stream carries data of the corresponding network slice, as shown in FIG. 8.

At step 708, for the first network slice, data associated with the at least one of the plurality of services supported by the first network slice may be communicated using the first data stream based on a first time-sensitive network policy associated with the first data stream such that data related to the first network slice communicated using the first data stream is isolated from data related to another of the plurality of network slices (which data of other slices may be communicated using other data streams). In some implementations, each TSN data stream may have or correspond to a unique TSN policy, which is used for communication of data of the corresponding network slice. TSN policies may be based on the IEEE 802.1AS standard.

In some implementations, management and control of 5G network slices is a time-sensitive operation that may also benefit from the TSN implementation within the 5G system. Accordingly, the method 700 may further include determining a second data stream of the plurality of data stream corresponding to the first network slice. Management and control data associated with the first network slice may be communicated using the second data stream based on a second time-sensitive network policy associated with the second data stream. The first and second data streams may be the same, or the first and second time-sensitive network policies may be the same.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the claimed invention as defined by the claims. For example, specific features of the exemplary embodiments may or may not be part of the claimed invention, different components as opposed to those specifically mentioned may perform at least some of the features described herein, and features of the disclosed embodiments may be combined. As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

As used herein, an element or step recited in the singular and proceeded with the word "a" or "an" should be understood as not excluding plural of said elements or steps, unless such exclusion is explicitly stated. Furthermore, references to "one implementation" of the presently described subject matter are not intended to be interpreted as excluding the existence of additional implementations that also incorporate the recited features. Moreover, unless explicitly stated to the contrary, implementations "comprising" or "having" an element or a plurality of elements having a particular property may include additional such elements not having that property.

It is to be understood that the above description is intended to be illustrative, and not restrictive. For example, the above-described implementations (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary implementations. Many other implementations will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several implementations of the subject matter set forth herein, including the best mode, and also to enable a person of ordinary skill in the art to practice the implementations of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method of communication over a communication network, the method comprising:
  determining a plurality of network slices of the communication network based on a plurality of services supported by the communication network, wherein each of the plurality of network slices is configured to support communication of data associated with at least one of the plurality of services, and the communication network is configured to support time-sensitive network (TSN) interconnection communication based on a TSN mechanism;
  configuring a plurality of data streams within the communication network, each data stream being configured in accordance with at least one of a plurality of time-sensitive network policies;
  determining a first data stream of the plurality of data streams corresponding to a first network slice of the plurality of network slices; and
  for the first network slice, communicating, over the communication network, data associated with the at least one of the plurality of services supported by the first network slice, wherein the data is communicated using the first data stream based on a first time-sensitive network policy associated with the first data stream such that data related to the first network slice communicated using the first data stream is isolated from data related to another of the plurality of network slices.

2. The method of claim 1, further comprising:
  determining a second data stream of the plurality of data stream corresponding to the first network slice; and
  communicating, over the communication network, control data associated with the first network slice using the second data stream based on a second time-sensitive network policy associated with the second data stream.

3. The method of claim 2, wherein the first and second data streams are the same, or the first and second time-sensitive network policies are the same.

4. The method of claim 1, wherein the first time-sensitive network policy defines scheduling or latency parameters for data communication using the first data stream.

5. The method of claim 1, wherein the first time-sensitive network policy defines a priority order of data communication using the first data stream with respect to the other of the plurality of data streams.

6. The method of claim 1, further comprising:
  determining a second data stream of the plurality of data streams corresponding to a second network slice of the plurality of network slices; and
  for the second network slice, communicating, over the communication network, data associated with the at least one of the plurality of services supported by the second network slice, wherein the data is communicated using the second data stream based on a second time-sensitive network policy associated with the second data stream.

7. The method of claim 6, wherein first and second time-sensitive network policies are based on the IEEE 802.1AS standard.

8. The method of claim 1, wherein the first data stream is determined based on the first time-sensitive network policy for scheduling parameters for the TSN interconnection communication using the first data stream.

9. A system for communication over a communication network, the system comprising:

one or more processors configured to:

determine a plurality of network slices of the communication network based on a plurality of services supported by the communication network, wherein each of the plurality of network slices is configured to support communication of data associated with at least one of the plurality of services, and the communication network is configured to support time-sensitive network (TSN) interconnection communication based on a TSN mechanism;

configure a plurality of data streams within the communication network, each data stream being configured in accordance with at least one of a plurality of time-sensitive network policies;

determine a first data stream of the plurality of data streams corresponding to a first network slice of the plurality of network slices; and for the first network slice, communicate, over the communication network, data associated with the at least one of the plurality of services supported by the first network slice, wherein the data is communicated using the first data stream based on a first time-sensitive network policy associated with the first data stream such that data related to the first network slice communicated using the first data stream is isolated from data related to another of the plurality of network slices.

10. The system of claim 9, wherein the one or more processors are further configured to:

determine a second data stream of the plurality of data stream corresponding to the first network slice; and communicate, over the communication network, control data associated with the first network slice using the second data stream based on a second time-sensitive network policy associated with the second data stream.

11. The system of claim 9, wherein the first and second data streams are the same, or the first and second time-sensitive network policies are the same.

12. The system of claim 9, wherein the first time-sensitive network policy defines scheduling or latency parameters for data communication using the first data stream.

13. The system of claim 9, wherein the first time-sensitive network policy defines a priority order of data communication using the first data stream with respect to the other of the plurality of data streams.

14. The system of claim 9, wherein the one or more processors are further configured to:

determine a second data stream of the plurality of data streams corresponding to a second network slice of the plurality of network slices; and for the second network slice, communicate, over the communication network, data associated with the at least one of the plurality of services supported by the second network slice, wherein the data is communicated using the second data stream based on a second time-sensitive network policy associated with the second data stream.

15. The system of claim 14, wherein first and second time-sensitive network policies are based on the IEEE 802.1AS standard.

16. The system of claim 8, wherein the first data stream is determined based on the first time-sensitive network policy for scheduling parameters for the TSN interconnection communication using the first data stream.

* * * * *